(12) United States Patent
Kovummal (10) Patent No.: US 7,652,982 B1
(45) Date of Patent: Jan. 26, 2010

(54) PROVIDING HIGH AVAILABILITY NETWORK SERVICES

(75) Inventor: Ashwin Kovummal, Tyngsboro, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 811 days.

(21) Appl. No.: 11/280,925

(22) Filed: Nov. 16, 2005

(51) Int. Cl.
*G01R 31/08* (2006.01)
*G06F 11/00* (2006.01)

(52) U.S. Cl. .......................................... 370/216; 714/2
(58) Field of Classification Search .................. 370/216; 714/1, 2
See application file for complete search history.

(56) References Cited

U.S. PATENT DOCUMENTS

2002/0087687 A1* 7/2002 Zaifman et al. ............. 709/225

* cited by examiner

*Primary Examiner*—Kevin C Harper
(74) *Attorney, Agent, or Firm*—Shumaker & Sieffert, P.A.

(57) ABSTRACT

The principles of the invention allow a network device, such as a router, to maintain a high level of services during a failure without substantially utilizing redundant hardware components. During execution, the network device stores a subset of state information associated with applications executing on the network device. In the event of a failure, the network device reconstructs data structures associated with at least one of the applications based on the stored subset of state information. Next, the network device restarts at least one of the applications to resolve the failure. While restarting, the network device may continue to receive and forward information, such as packets, and, therefore, may continue to provide a high level of access to client devices previously connected to the network device. Thus, because the network device need not transfer control to a redundant hardware component, the network device may provide high availability without utilizing redundant hardware components, thereby potentially reducing the cost of high-availability routers.

30 Claims, 4 Drawing Sheets

PROVIDING HIGH AVAILABILITY NETWORK SERVICES

TECHNICAL FIELD

The invention relates to computer networks and, more particularly, to providing high availability for network devices within a computer network.

BACKGROUND

Routing devices within a network, often referred to as routers, maintain routing information that describe available routes through the network. Upon receiving an incoming packet from a client device, the router examines information within the packet and forwards the packet in accordance with the routing information. The router may continually receive and forward packets throughout the network, and some routers may have high availability features that provide client devices with a high level of access to routing services. In other words, routers having high availability features do not fail to provide routing services as often as other routers.

Generally, routers having high availability features provide a high level of access by maintaining redundant hardware components. For example, a router may include active line cards to receive and forward the packets, and redundant line cards to assume responsibility for the operations of any of the active line cards should one or more of the active line cards fail. The router may keep the redundant line cards warm, i.e., operational but not active, by replicating the configuration changes of the active line cards to the redundant line cards. Thus, in the event that one of the active line cards fails, the router may quickly transfer control to one of the redundant line cards, thereby allowing the router to offer continued routing services despite failure of one of the active line cards.

Routers that provide high-availability routing services are typically more expensive than standard routers because of the added cost incurred by including the redundant hardware components. As a result, some routers include a single redundant line card for multiple active line cards in an attempt to reduce the cost of the high level access features. If the number of failing active line cards exceeds the number of redundant line cards, the router may still fail to offer routing services.

SUMMARY

In general, the principles of the invention allow a network device, such as a router, to maintain a high level of functionality even in the event of a failure. Moreover, the high level of functionality may be achieved without substantially utilizing redundant hardware components. For example, the high level of functionality may be achieved without requiring use of one or more redundant line cards, forwarding components or routing components.

During execution, the network device stores a subset of state information associated with software applications executing on the network device. In the event of a failure, the network device uses the stored subset of state information to reconstruct data structures associated with any of the applications affected by the failure. Next, the network device restarts the applications to resolve the failure. The time period associated with this "warm restart" may be significantly reduced since the software application is restarted from a recent state prior to the failure.

Moreover, while restarting the software application, the network device may continue to receive and forward information, such as packets, and, therefore, may continue to provide a high level of routing services. For example, the network device may continue to provide network access to client devices previously connected to the network device. Because the network device need not transfer control to a redundant hardware component, the network device may provide high availability without utilizing redundant hardware components, thereby potentially reducing the cost of high-availability routers.

In one embodiment, a method comprises storing a subset of state information associated with applications executing on a network device, reconstructing data structures associated with at least one of the applications based on the stored subset of state information in response to a failure of the network device and restarting at least one of the applications. The method further comprises storing the subset of state information to a memory of the network device that stores both the subset of the state information and the applications.

In another embodiment, a network device comprises a control unit that stores a subset of state information associated with applications executing on a network device, reconstructs data structures associated with at least one of the applications based on the stored subset of state information in response to a failure of the network device, and restarts at least one of the applications. The network device further comprises a memory that stores both the subset of state information and the applications, wherein the control unit stores the subset of state information by storing the subset of state information to the memory.

In another embodiment, a computer-readable medium comprises instructions for causing a programmable processor to store a subset of state information associated with applications executing on a network device, reconstruct data structures associated with at least one of the applications based on the stored subset of state information in response to a failure of the network device; and restart at least one of the applications. The computer-readable medium further comprises instructions that cause the processor to store the subset of state information by storing the subset of state information to a memory of the network device that stores both the subset of the state information and the applications.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
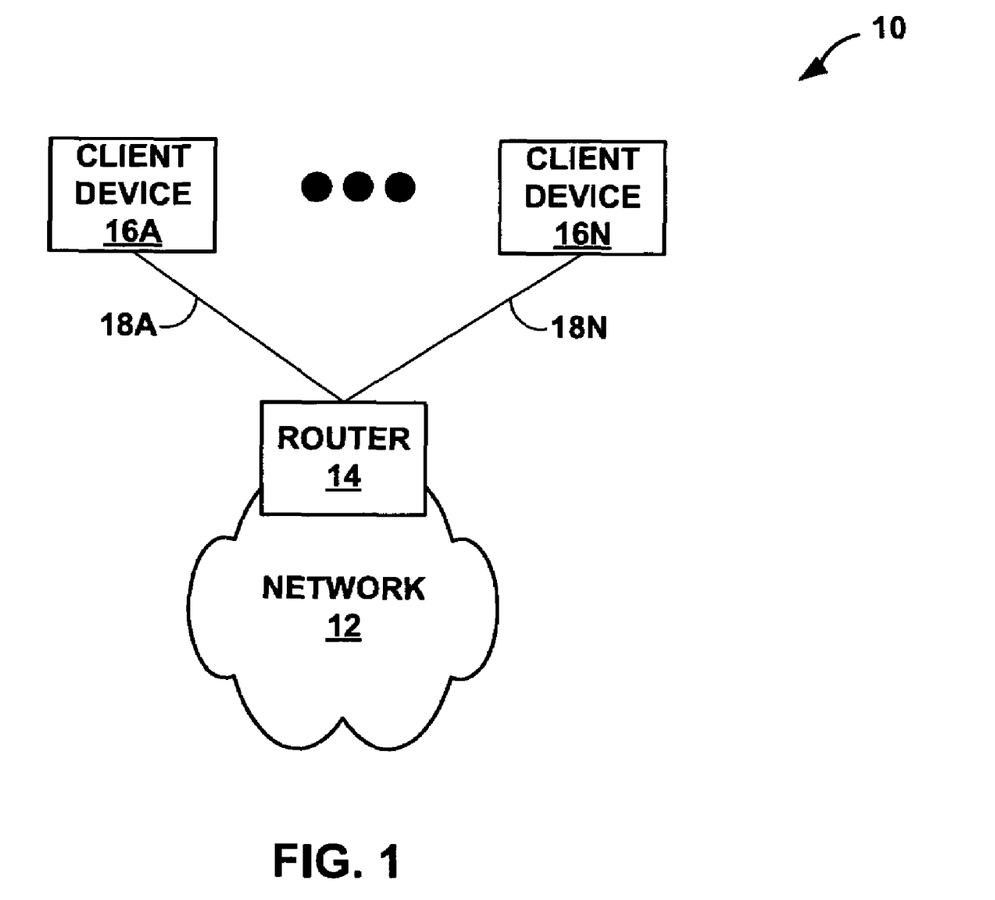
FIG. 1 is a block diagram illustrating an exemplary network system that provides high-availability routing services.

FIG. 1 is a block diagram illustrating an exemplary network system 10 in which a router 14 provides high-availability routing services. In this example, network system 10 includes a network 12 that may represent a customer network, a service provider network, a local-area network, or other common network types. Network 12 includes a router 14 that provides high-availability routing services to client devices 16A-16N ("client devices 16") connected to router 14 via respective links 18A-18N ("links 18"). Network 12 may also include other network devices, such as other routers, switches, hubs, gateways, session border controllers, VPN devices, and network acceleration devices. Client devices 16 may comprise any number of personal computers, laptops, workstations, wireless devices, personal digital assistants (PDAs), cellular phones, network ready appliances, or other devices. While described herein in reference to a router, the principles of the invention may apply to other devices, such as any of the network devices listed above.

Network 12 may comprise a packet-based network capable of transmitting data via structured packets, and router 14 may represent a network device capable of forwarding packets received from client devices 16 along links within network 12 (not shown in FIG. 1). As described herein, router 14 comprises a high-availability router capable of offering client devices 16 a high level of access to the routing services offered by router 14. In general, client devices 16 transmit the packets to router 14 via links 18, and router 14 forwards the packets either through network 12 or to destination devices located within network 12. While forwarding packets, router 14 may also perform other routing services, such as accepting new connections from client devices 16, monitoring network connections, establishing new network links, and communicating with other network devices.

While performing these routing services, router 14 continually updates state information to reflect the changing network and router conditions. For example, router 14 may update state information to reflect acceptance of a new connection from one of client devices 16. Other examples of state information maintained by include router 14 may include topology information, status of interface cards, chassis configuration and other information. Router 14 stores a subset of the state information to a memory (not shown in FIG. 1) in case router 14 detects a failure within router 14. The subset of state information may include information that enables router 14 to reach a stable state after warm restarting; however, router 14 does not necessarily store the state information in its entirety to avoid duplicating the state that caused the failure. The term "warm restart" is generally used herein to refer to restarting with some form of data (i.e. a recent state), rather than restarting from a blank state (i.e. state zero).

During execution, router 14 may fail for a variety of reasons. Router 14 may fail, for example, because it receives a malignant packet that causes a software exception, enters into an unstable state due to a denial-of-service attack or software failure, or receives configuration commands that incorrectly configure router 14. Upon detecting a failure, router 14 continues to operate despite the failure by restarting to resolve the failure based on the subset of state information stored to the memory. Prior to the restart, router 14 reconstructs data structures associated with at least one of the applications based on the stored subset of state information in response to a failure of the network device, as described below in more detail. The restart does not disable all of the routing services, and router 14 may continue to receive and forward packets, thereby maintaining high availability without transferring operation to a redundant component.

Thus, router 14 provides high availability to client devices 16 without employing redundant components, which may significantly reduce the cost of router 14 in comparison to other high-availability routers. Moreover, as described below in more detail, router 14 may continue to operate despite multiple line card failures, and, further, router 14 may continue to offer high availability even in the event of simultaneous failures of every line card within router 14. While discussed herein with respect to a line card, the principles of the invention may apply to a router control unit that controls router 14.

Figure 2:
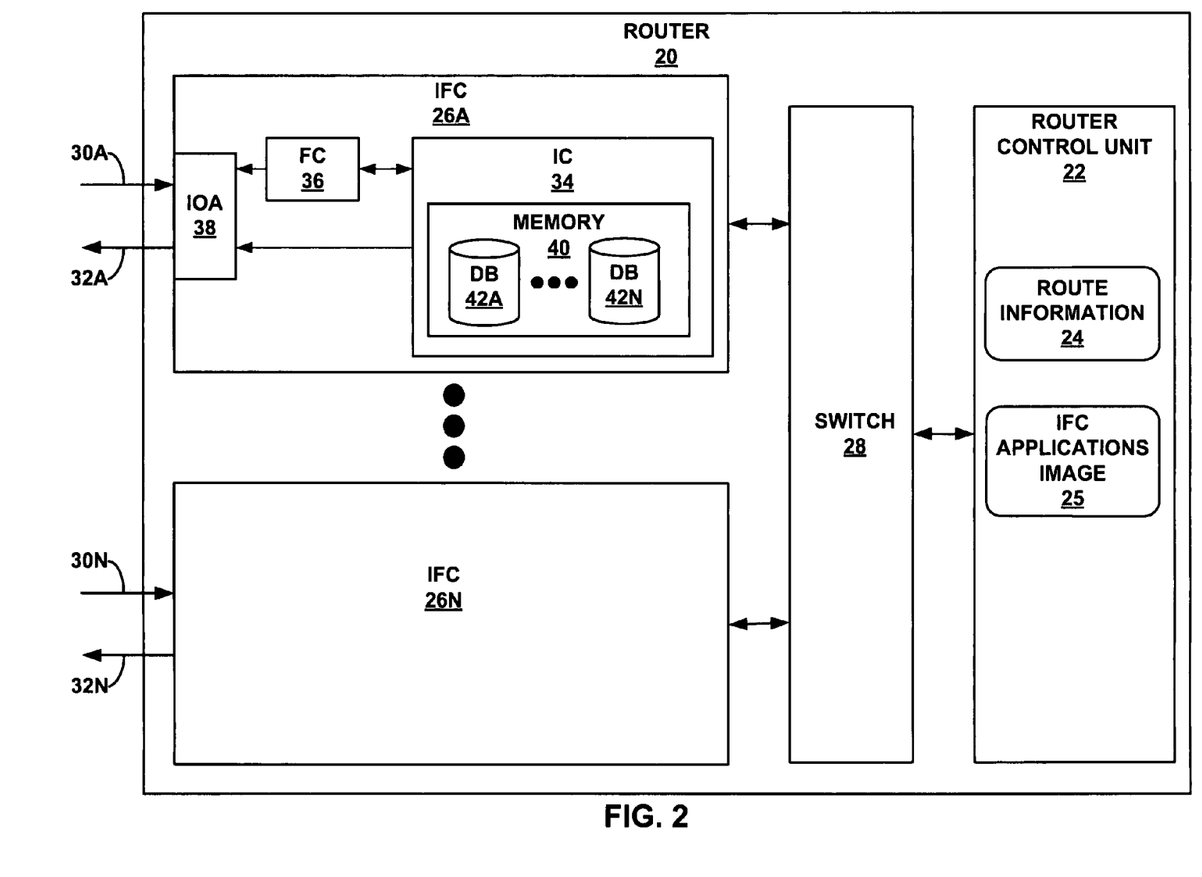
FIG. 2 is a block diagram illustrating an exemplary router that provides high-availability routing services to client devices, such as the client devices of FIG. 1.

FIG. 2 is a block diagram illustrating an exemplary router 20 that provides high availability to client devices, such as client devices 16 of FIG. 1. Router 20 may be substantially similar to router 14 and may perform the actions described above to offer high-availability routing services without requiring substantial additional, or redundant, components.

As shown in FIG. 2, router 20 includes a router control unit 22 that maintains route information 24 and an interface card applications image 25 ("IFC applications image 25"). Router control unit 22 maintains route information 24 to reflect the current topology of a network, e.g., network 12, and other network entities to which router 22 may be connected. For example, router control unit 22 provides an operating environment for routing protocols, such as the Border Gateway Protocol (BGP), the Open Shortest Path First (OSPF) routing protocol or other routing protocols.

Interface card applications image 25 may comprise images of software applications for execution on interface cards 26A-26N ("IFCs 26"). Each of interface cards 26 may download and execute interface card applications image 25 upon powering up, thereby saving storage space on each of interface cards 26. Router control unit 22 may comprise a programmable processor that executes instructions stored on a computer-readable medium, such as a hard drive, a flash memory, or a random access memory (RAM). The instructions may cause the programmable processor to carry out the actions described herein.

Router 20 also includes switch 28 for coupling interface cards 26 to router control unit 22. Generally, interface cards 26 receive and forward packets via inbound links 30A-30N and outbound links 32A-32N, respectively. Each of interface cards 26 may be substantially similar and may each adhere to the principles of the invention, as described below. Therefore, for ease of illustration, only interface card 26A is shown in detail in FIG. 2. However, each of interface cards 26 may comprise similar components to that of interface card 26A. Moreover, while the principles of the invention are discussed in reference to interface card 26A, each of interface cards 26 may adhere to the principles of the invention and may operate in a manner similar to that as described below in reference to interface card 26A.

Interface card 26A comprises an interface controller 34 ("IC 34"), a forwarding controller 36 ("FC 36"), and an input output adapter 38 ("IOA 38"). Interface controller 34 comprises the main controller for interface card 26A and controls the operation of forwarding controller 36. Forwarding controller 36 includes a processor responsible for handling the forwarding of packets received from input output adapter 38 and any packets received from other interface cards 26 via switch 28. In some embodiments, interface cards 26 may include multiple forwarding controllers, each of which may comprise a processor responsible for forwarding packets. Input output adapter 38 includes physical layer interfaces, such as asynchronous transfer mode (ATM), gigabyte Ethernet (GE), or channelized optical carrier signaling (COCX) physical layer interfaces, to receive and forward data via inbound link 30A and outbound link 32A, respectively.

Interface controller 34, as shown in FIG. 2, comprises a memory 40 that may include any type of memory capable of storing databases 42A-42N ("DBs 42"), such as a hard drive, flash memory, or random access memory (RAM). Databases 42 provide storage for the subset of state information associated with the execution of applications on each of the respective interface cards 26. Interface controller 34 accesses databases 42 to reconstruct the data structures associated with at least one of the applications based on the subset of state information stored in databases 42. Furthermore, interface controller 34 synchronizes the reconstructed data structures with the state of the interface card hardware. Interface controller 34 may comprise a control unit that provides a platform upon which the applications execute, in which case interface controller 34 reconstructs the data structures associated with at least one of these applications based on the stored subset of state information in response to a failure of the network device. Further, memory 40 may store both the subset of state information and the applications, as well as, any platform, i.e., operating system, upon which the applications execute.

Initially, upon power up, interface controller 34 connects to router control unit 22 via switch 28 to download interface card applications image 25 and initializes itself, forwarding controller 36 and input output adapter 38 in accordance with interface card applications image 25. Interface card applications image 25 may comprise executable instructions that direct operation of processors within each of interface controller 34 and forwarding controller 36. During initialization of interface controller 34, interface controller 34 may create databases 42 within memory 40 and assign one of databases 42 to the applications executing within interface controller 34. Once initialized, interface controller 34 stores a backup of a portion of interface card applications image 25 to memory 40 so that interface controller 34 may quickly restart in the event of a failure. Interface controller 34 may further notify router control unit 22 that it is ready to receive and forward packets from client devices. Upon receiving this notification, router control unit 22 may direct new user connections to interface card 26A, and interface card 26A becomes an active interface card.

During execution, interface controller 34 receives requests from client devices seeking to establish a new connection with router 20, and interface controller 34 may grant these connections and construct one or more appropriate software interfaces for each of the connections. The software applications executing within interface controller 34 maintain state information concerning these new connections. The state information may comprise, for example, connection session information, connection attributes, profile information for particular interfaces, interface stack information, and quality of service information for each connection. The software applications may store a subset of this state information to their respective one of databases 42 by first writing the state information and, next, posting the state information to databases 42. Information written to databases 42 but never posted is removed from the database, thereby ensuring that the applications do not corrupt databases 42 should a failure occur during the write phase.

In the event of a failure, such as receiving a malignant packet, within interface card 26A, interface controller 34 may trigger a warm restart. A warm restart does not cause forwarding controller 36 or input output adapter 38 to restart, but only restarts interface controller 34. Thus, forwarding controller 36 and input output controller 38 may continue to receive and forward packets along inbound link 30A and outbound link 32A, respectively. Interface controller 34 restarts by reloading the portion of the image stored in memory 40, and, once reloaded, interface controller 34 accesses databases 42 to restore the applications to their last state stored to databases 42. Interface controller 34 reconstructs data structures from the subset of state information stored to databases 42.

Next, interface controller 34 synchronizes the reconstructed data structures with the state of the interface card hardware. To complete this synchronization, interface controller 34 steps through a hardware event log to determine the updated state of the hardware prior to the failure. Interface controller 34 configures the hardware of forwarding controller 36 and input output controller 38 such that the hardware is properly configured to execute the reconstructed data structures.

Interface controller 34 then restarts the applications and passes the reconstructed data structures to the application, which rebuild the last saved state based on the data structures. The applications may then resume execution from the last saved state.

In this manner, interface card 26A may continue to offer a high level of access to client devices despite a failure within interface card 26A. Moreover, because interface card 26A, in effect, acts as its own redundant component, router 20 may offer high-availability routing services without incurring the additional cost of redundant components. Additionally, because each of interface cards 26 acts as its own redundant component, the ratio of active interface cards to redundant interface cards is one to one; however, router 20 incurs only minimal cost compared with conventional high-availability routers having a greater ratio of active interface cards to redundant interface cards.

Figure 3:
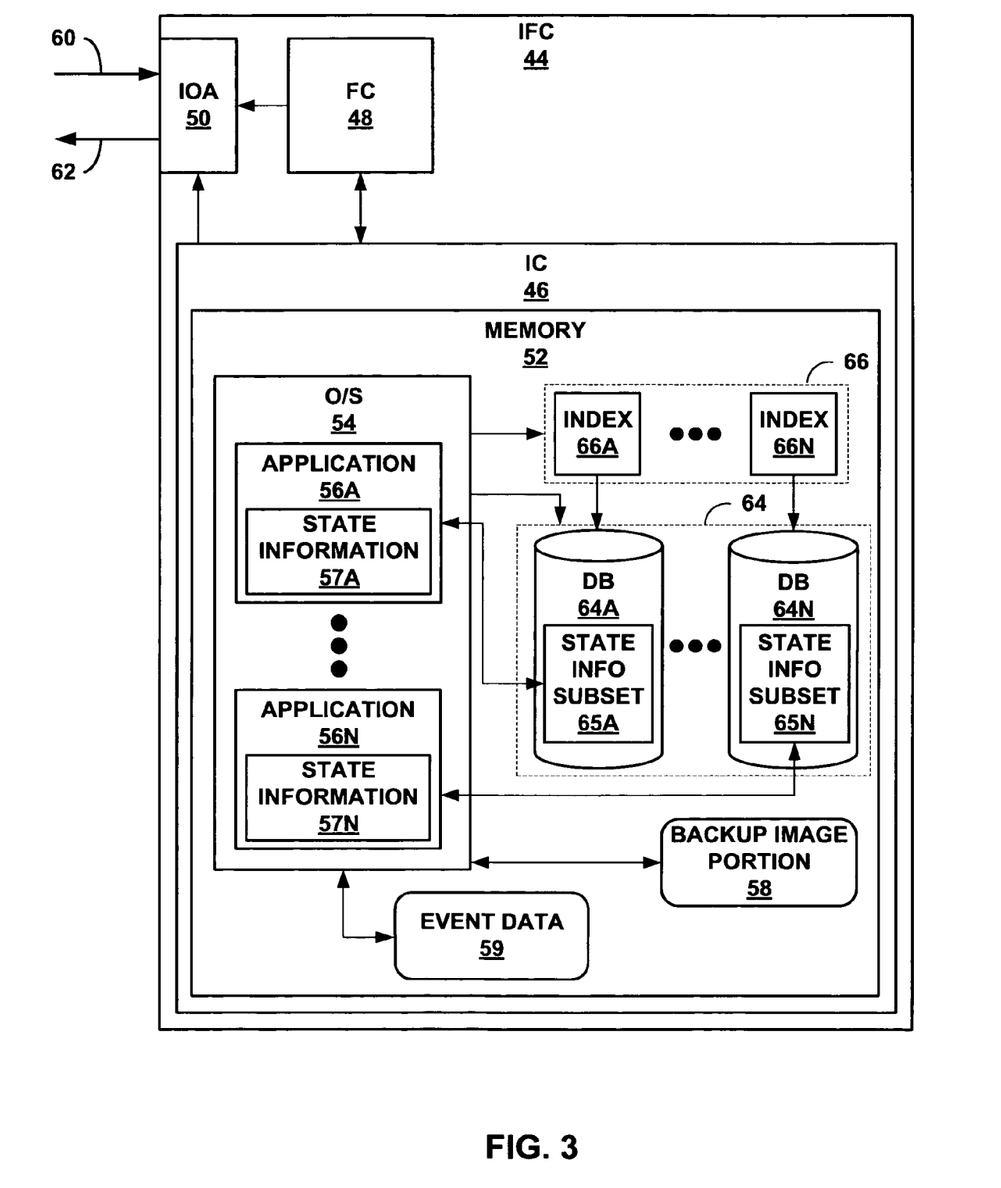
FIG. 3 is a block diagram illustrating an exemplary interface card that provides high availability without switching to a redundant interface card consistent with the principles of the invention.

FIG. 3 is a block diagram illustrating an exemplary interface card 44 that provides high availability without switching to a redundant interface card consistent with the principles of the invention. Interface card 44 ("IFC 44") may be substantially similar to interface card 26A of FIG. 2, and may operate within a router, such as router 20, to facilitate the router in providing high-availability routing services to client devices, as described above.

Interface card 44 includes an interface controller 46 ("IC 46"), a forwarding controller 48 ("FC 48"), and an input output adapter 50 ("IOA 50"), similar to interface card 26A. Interface controller 46 comprises a memory 52 that stores an operating system 54 ("O/S 54") upon which applications 56A-56N ("applications 56") may execute. Each of applications 56 may comprise one or more executable programs that control the operation of interface controller 46 and maintain state information 57A-57N ("state information 57") internal to applications 56. Memory 52 may further store a backup image portion 58, databases 64A-64N ("DBs 64") that store subsets of state information 65A-65N ("state info subsets 65"), and indexes 66A-66N ("indexes 66"), all of which are described in more detail below. Moreover, memory 52 may store a hardware event log for interface card 44 within event data 59.

As in interface card 26A, interface controller 46 couples to forwarding controller 48 and input output adapter 50, and upon start up, interface controller 46 may initialize forwarding controller 48 and input output adapter 50, as well as, initialize itself according to an interface card application image, such as interface card applications image 25. Interface controller 46 may connect to the control unit, such as router control unit 22, via a switch, such as switch 28, to download the image of all applications executing on the interface card. For example, the image may comprise three sections. The first section may include ".text" section containing read only variables that are protected from corruption. The second section may include a ".bss" section containing software executables. Finally, the third section may include a ".data" section containing data structures or working memory associated with the applications. Once downloaded, interface controller 46 may backup a portion of the image to memory 52, as represented by backup image portion 58 in FIG. 3. In particular, backup image portion 58 may comprise the ".data" portion of the interface card application image downloaded from the router control unit. In other words, IC 46 may create a backup of the ".data" portion of the downloaded interface card application image.

After initializing forwarding controller 48 and input output adapter 50 and storing backup image portion 58 to memory 52, interface card 44 may begin receiving and forwarding packets via inbound link 60 and outbound link 62, respectively. Operating system 54 may begin to direct control of interface controller 46 after initialization, and operating system 54 may first create databases 64 within memory 52 and, second, store indexes 66 to a protected portion of memory 52. Operating system 54 may store indexes 66 to a protected portion of memory 52 so that indexes 66 may not be overwritten or corrupted by any other application or component that has access to memory 52.

Upon creating databases 64 and storing indexes 66, operating system 54 may cause interface controller 46 to notify the router control unit via the switch that interface card 44 may begin accepting connections. The router control unit next directs new connections to interface card 44, and applications 56 may communicate with the client device seeking the connection to determine whether to grant or deny the connection. Regardless of whether applications 56 grant or deny the connection, the state of applications 56 and the state of the interface card hardware configuration stored within event data 59 may change. In response to changes of state, applications 56 update state information 57 internal to applications 56, as well as, store subsets of the internal state information 57 to one of databases 64, as represented by state information subsets 65. Typically, operating system 46 assigns each of applications 56 a respective one of databases 64 to which each of applications 56 may store state information subsets 65. For example, application 56A stores state information subset 65A to database 64A, and application 56B stores state information subset 65B to database 64B. Thus, databases 64 each maintain state information subsets 65, which comprise a subset of state information 57 stored internally to respective applications 56.

Applications 56 store state information subsets 65 to their respective databases 64 via a two phase process. During the first write phase, applications 56 write to state information subsets 65, as changes occur to state information 57. For example, application 56A may grant a new connection and record this new connection to state information 57A. During the process of granting the new connection, application 56A may store session information relating to the client device requesting the new connection, connection attributes, such as the maximum and minimum connection speeds, quality of service requirements for the new connection, interface stack information, and other information relating to the new connection to state information 57A. After storing some of this information internally to state information 57A, application 56A may write a subset of this information, i.e., state information subset 65A, to its respective database, i.e., database 64A. Upon finally granting the new connection, application 54 may grant the new connection and perform the second phase of the two phase process by posting the written information to state information subset 65A in database 64A. The posting phase commits the previously written information to state information subset 65A. The two-phase process ensures that applications 56 do not corrupt databases 64 because operating system 54 removes information written but not posted to databases 64 in the event that interface card 44 fails, thereby preserving databases 64 from recording an incomplete state.

As described above, information is stored to state information subsets 65 during the second, posting phase of the two phase process. In contrast, hardware information is stored to event data 59 via a one phase process. For example, application 56A may grant a new connection and record this new connection to event data 59 prior to posting the changes to state information subsets 65. Thus, a failure may occur after updating event data 59 prior to updating state information subset 65, thereby establishing the need for interface controller 46 to synchronize the hardware configuration within event data 59 to the reconstructed data structures containing information from state information subset 65 after the failure is detected.

Interface card 44 may fail for any of the above described reasons, and interface controller 46 may detect the failure by receiving exceptions either internally from applications 56 or operating system 54 or externally from forwarding controller 48 or input output adapter 50. Upon determining the failure, operating system 54 first removes any information written but not posted to databases 64 and respective state information subsets 65. Next, interface controller 46 restarts to resolve the failure. In particular, firmware within interface controller 46 reloads backup image portion 58, which in turn restarts operating system 54. Upon reloading backup image portion 58, operating system 54 accesses indexes 66, which direct operating system 54 to addresses in memory 52 that store databases 64. Operating system 54 accesses each of databases 64 to read state information subsets 65 and reconstructs data structures associated with applications 56 based on state information subsets 65. For example, operating system 54 may access database 64A to reconstruct a data structure for application 56A based on state information subset 65A.

After reconstructing, or building, the data structures, interface controller 46 synchronizes the reconstructed data structures with the state of the interface card hardware by accessing event data 59 and processing one event at a time to determine any necessary hardware configuration updates. Interface controller 46 then updates forwarding controller 48 and input output adapter 50 until the hardware configuration is synchronized with the reconstructed data structures. Next, operating system 54 restarts applications 56 and passes the data structures to its respective one of applications 56, and each of applications 56 may use the data structures to rebuild the last state saved to databases 64. Because applications 56 only stored a subset of their respective state information 57, i.e., state information subsets 65, applications 56 will not enter into the state that previously caused the failure and may resume operation without endlessly duplicating the state that caused the failure. During the warm restart interval, interface card 46 may notify the router control unit that it cannot accept new connections, however, interface card 46 may continue to receive and forward packets because forwarding controller 48 and input output adapter 50 remain functional, i.e., do not restart. Once applications 56 rebuild the last stored state and resume operation according to this state, interface controller 46 may notify the router control unit that it can accept new connections, and the control unit may begin directing new connections to interface card 44 via the switch.

In this manner, interface card 44 effectively functions as its own redundant line card and may continue to offer high availability despite an internal failure. Furthermore, by storing backup image portion 58 to memory 52, interface card 44 may accept new connections more quickly after a warm restart because interface controller 46 does not need to download the full interface card applications image from the control unit, which may require a significant amount of time. Moreover, by restarting only interface controller 46, interface card 44 may continue to receive and forward packets via forwarding controller 48 and input output adapter 50 despite the failure.

Figure 4:
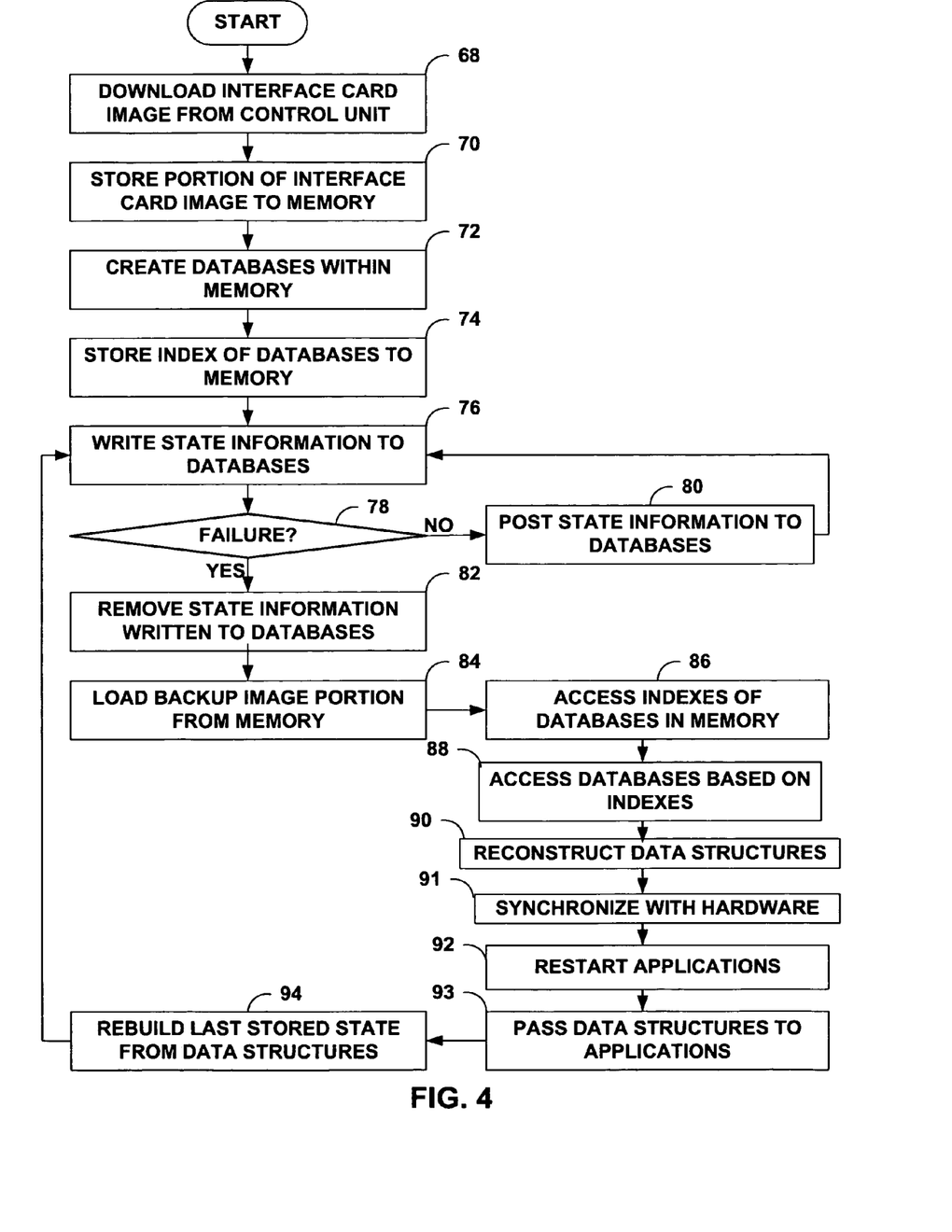
FIG. 4 is a flowchart illustrating exemplary operation of an interface card consistent with the principles of the invention.

FIG. 4 is a flowchart illustrating exemplary operation of an interface card, such as interface card 44 of FIG. 3, consistent with the principles of the invention. While FIG. 4 is discussed below in reference to an interface card, any component within a network device, such as router control unit 22 of FIG. 2, may perform the actions discussed below to provide high availability without switching operation to a redundant component.

Initially, upon startup, interface controller 46 downloads an interface card applications image, such as interface card applications image 25, from a control unit, such as router control unit 22, and stores a portion of the interface card applications image, e.g., backup image portion 58, to memory 52, as described above (68, 70).

Next, operating system 54 creates databases 64 within memory 52 and stores indexes 66 to memory 52 (72, 74). Interface card 44 may then accept new connections and begin receiving and forwarding packets via inbound link 60 and outbound link 62, respectively. Typically, applications 56 determine whether to accept or deny connections and change state information 57 internal to each of applications 56. After changing state information 57, applications 56 perform the two phase process to store a subset of the state information, i.e., state information subsets 65, to databases 64, as described above. First, each of applications 56 write a subset of their internally maintained state information 57 to its respectively assigned one of databases 64 (74). If no failure occurs, applications 56 complete the two phase process by posting a subset of state information 57 to state information subsets 65 stored in their respectively assigned one of databases 64 ("NO" branch of 78, 80). However, if interface controller 46 detects a failure, operating system 54 removes any subset of state information written, but not posted, to databases 64 ("YES" branch of 78, 82), thus preventing databases 64 from storing an incomplete state.

After removing the written state information, interface controller 46 loads backup image portion 58 from memory 52 (84), and operating system 54 may resume control of interface controller 46 after loading backup image portion 58. Operating system 54 accesses indexes 66 stored in memory 52 and accesses databases 64 based on indexes 66, as described above (86, 88). Operating system 54 reconstructs data structures based on state information subsets 65 stored in databases 64 (90). Once the data structures are reconstructed, operating system 54 synchronizes the interface card hardware with the reconstructed data structures (91). After synchronizing the data structures to the hardware, operating system 54 restarts applications 56 and passes the data structures to applications 56, which use the data structures to rebuild the last state stored to databases 64 (92, 93, 94). Upon rebuilding the last stored state, interface card 44 may inform the router control unit that it has recovered and may resume accepting new connections. Thus, applications 56 may continue to write and post a subset of their internally maintained state information 57 to databases 64 (76-80).

In this manner, interface card 44 may provide a high level of access, i.e., high availability, to routing services without requiring that operation be switched to a redundant interface card in response to a failure. While the principles of the invention are described in reference to an interface card, the principles of the invention may apply to any component of a network device, such as router control unit 22 (FIG. 2), and may allow the network device to eliminate or reduce any form of redundant components. In this way, the principles of the invention may significantly reduce the cost of network devices because the network device does not incur the additional cost associated with redundant components. Moreover, the principles of the invention may facilitate less network device down time because a network device acting in accordance with the principles of the invention may provide a one-to-one ratio of active components to redundant components by allowing each component to effectively provide its own redundancy, while conventional high-availability network devices generally provide a two, three or four to one ratio of active components to redundant components. Thus, a network device acting in accordance with the principles of the invention may provide a higher level of access than conventional high availability network devices for a lower cost. Various embodiments of the invention have been described. These and other embodiments are within the scope of the following claims.

The invention claimed is:

1. A method for restarting an application executing on a network device, the method comprising:

storing a subset of state information associated with applications executing on the network device;

reconstructing, with the network device, data structures associated with at least one of the applications based on the stored subset of state information in response to a failure of the network device, wherein reconstructing data structures comprises building the data structures with the network device based on the subset of state information, storing indexes that allow the network device to locate and access the data structures after restarting, and passing the data structures to the restarted applications; and restarting at least one of the applications on the network device.

2. The method of claim 1, further comprising storing hardware configurations of the network device and synchronizing the reconstructed data structures with the hardware configurations.

3. The method of claim 1, wherein storing the subset of state information comprises storing the subset of state information to a memory of the network device that stores both the subset of the state information and the applications.

4. The method of claim 1, wherein the failure prevents the network device from accepting new connections; and wherein restarting comprises restarting to allow the network device to accept the new connections based on the subset of state information.

5. The method of claim 1, wherein restarting comprises warm restarting to resolve the failure of the network device based on the subset of state information without reinitializing existing user connections.

6. The method of claim 5, wherein warm restarting comprises restarting at least one of the applications executing on a portion of the network device, wherein other portions of the network device remain functional during the warm restart and continue to communicate with a network.

7. The method of claim 1, wherein reconstructing comprises:

retrieving a backup of a portion of an image associated with the applications, and reconstructing the data structures from the backup portion of the image and the subset of state information.

8. The method of claim 1, wherein restarting comprises restarting at least one of the applications executing on a interface controller.

9. The method of claim 1, wherein restarting comprises restarting at least one of the applications executing on a router control unit.

10. The method of claim 1, wherein storing a subset of state information comprises storing at least one of connection session information, connection attributes, profile information for particular interfaces, interface stack information, and quality of service information for each connection.

11. A network device comprising:
a control unit that stores a subset of state information associated with applications executing on a network device,
wherein the control unit reconstructs data structures associated with at least one of the applications based on the stored subset of state information in response to a failure of the network device, and restarts at least one of the applications,
wherein the control unit reconstructs by:
building the data structures based on the subset of state information;
storing indexes that allow the network device to locate and access the data structures after restarting; and
passing the data structures to the restarted applications.

12. The network device of claim 11, further comprising a memory that stores both the subset of state information and the applications, wherein the control unit stores the subset of state information by storing the subset of state information to the memory.

13. The network device of claim 12, wherein the memory stores hardware configurations of the network device and wherein the control unit synchronizes the hardware configurations with the subset of state information.

14. The network device of claim 11,
wherein the failure prevents the network device from accepting new connections, and
wherein the control unit restarts to allow the network device to accept the new connections based on the subset of state information.

15. The network device of claim 11, wherein the control unit restarts by warm restarting to resolve the failure of the network device based on the subset of state information without reinitializing existing user connections.

16. The network device of claim 15, wherein the control unit warm restarts by restarting at least one of the applications executing on a portion of the network device, wherein other portions of the network device remain functional during the warm restart and continue to communicate with a network.

17. The network device of claim 11, wherein the control unit reconstructs by:
retrieving a backup of a portion of an image associated with the applications; and
reconstructing the data structures from the backup portion of the image and the subset of state information.

18. The network device of claim 11,
wherein the control unit comprises an interface controller, and
wherein the interface controller restarts at least one of the applications executing on the interface controller.

19. The network device of claim 11,
wherein the control unit comprises a router control unit, and
wherein the router control unit restarts at least one of the applications executing on the router control unit.

20. The network device of claim 11, wherein the control unit stores a subset of state information by storing at least one of connection session information, connection attributes, profile information for particular interfaces, interface stack information, and quality of service information for each connection.

21. A computer-readable medium comprising instructions for causing a programmable processor to:
store a subset of state information associated with applications executing on a network device;
reconstruct data structures associated with at least one of the applications based on the stored subset of state information in response to a failure of the network device; and
restart at least one of the applications,
wherein the instructions further cause the processor to reconstruct by:
building the data structures based on the subset of state information;
storing indexes that allow the network device to locate and access the data structures after restarting; and
passing the data structures to the restarted applications.

22. The computer-readable medium of claim 21, wherein the instructions further cause the processor to store the subset of state information by storing the subset of state information to a memory of the network device that stores both the subset of the state information and the applications.

23. The computer-readable medium of claim 22, wherein the instructions further cause the processor to store hardware configurations of the network device to the memory of the network device, and wherein the instructions cause the processor to synchronize the hardware configurations with the subset of state information.

24. The computer-readable medium of claim 21,
wherein the failure prevents the network device from accepting new connections, and
wherein the instructions further cause the processor to restart by restarting to allow the network device to accept the new connections based on the subset of state information.

25. The computer-readable medium of claim 21, wherein the instructions further cause the processor to restart by warm restarting to resolve the failure of the network device based on the subset of state information without reinitializing existing user connections.

26. The computer-readable medium of claim 25, wherein the instructions further cause the processor to warm restart by restarting at least one of the applications executing on a portion of the network device, wherein other portions of the network device remain functional during the warm restart and continue to communicate with a network.

27. The computer-readable medium of claim 21, wherein the instructions further cause the processor to reconstruct by:
retrieving a backup of a portion of an image associated with the applications; and
reconstructing the data structures from the backup portion of the image and the subset of state information.

28. The computer-readable medium of claim 21, wherein the instruction further cause the processor to restart by restarting at least one of the applications executing on a interface controller.

29. The computer-readable medium of claim 21, wherein the instructions further cause the processor to restart by restarting at least one of the applications executing on a router control unit.

30. The computer-readable medium of claim 21, wherein the instruction further causing the processor to store a subset of state information by storing at least one of connection session information, connection attributes, profile information for particular interfaces, interface stack information, and quality of service information for each connection.

* * * * *

UNITED STATES PATENT AND TRADEMARK OFFICE
CERTIFICATE OF CORRECTION

| | | |
|---|---|---|
| PATENT NO. | : 7,652,982 B1 | Page 1 of 1 |
| APPLICATION NO. | : 11/280925 | |
| DATED | : January 26, 2010 | |
| INVENTOR(S) | : Ashwin Kovummal | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Twenty-third Day of November, 2010

David J. Kappos
*Director of the United States Patent and Trademark Office*